Aug. 13, 1940.    A. L. STONE    2,211,178
METHOD OF MAKING A JOINT BOX ON END OF PIPE
Filed Aug. 21, 1937    3 Sheets-Sheet 1
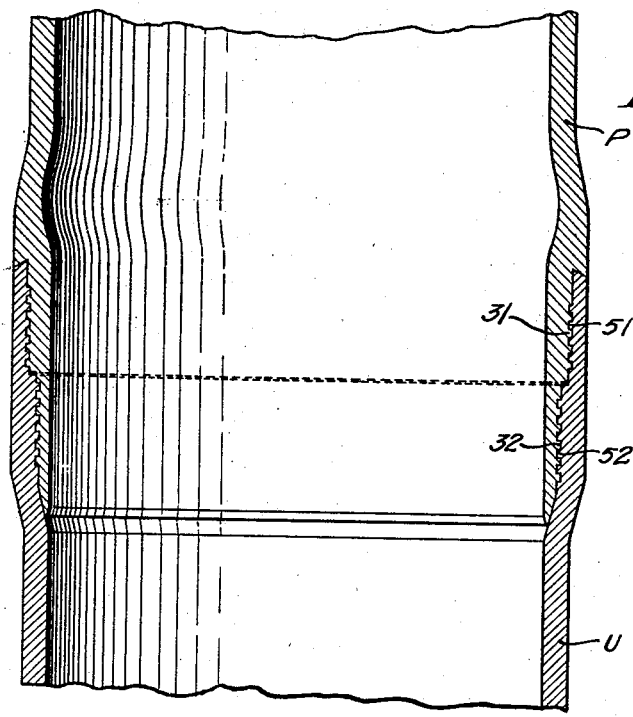
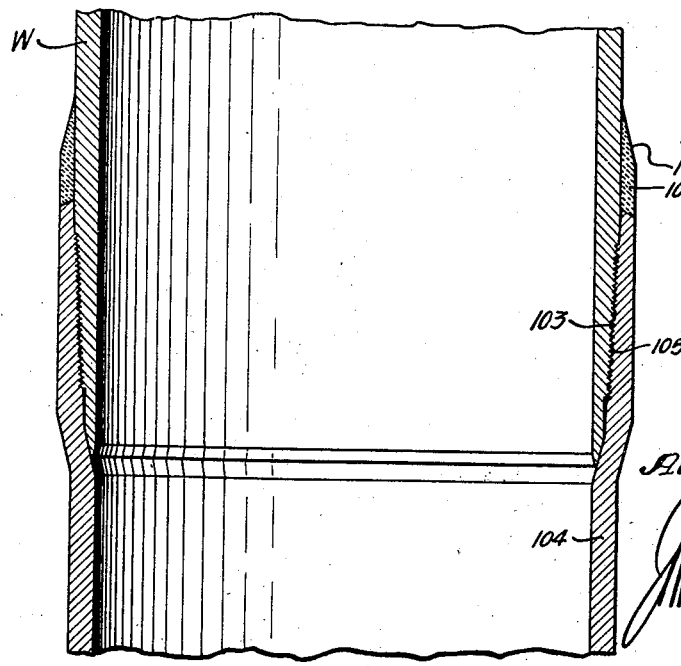
Inventor
Albert L. Stone.
Attorney.

Aug. 13, 1940.  A. L. STONE  2,211,178
METHOD OF MAKING A JOINT BOX ON END OF PIPE
Filed Aug. 21, 1937  3 Sheets-Sheet 2
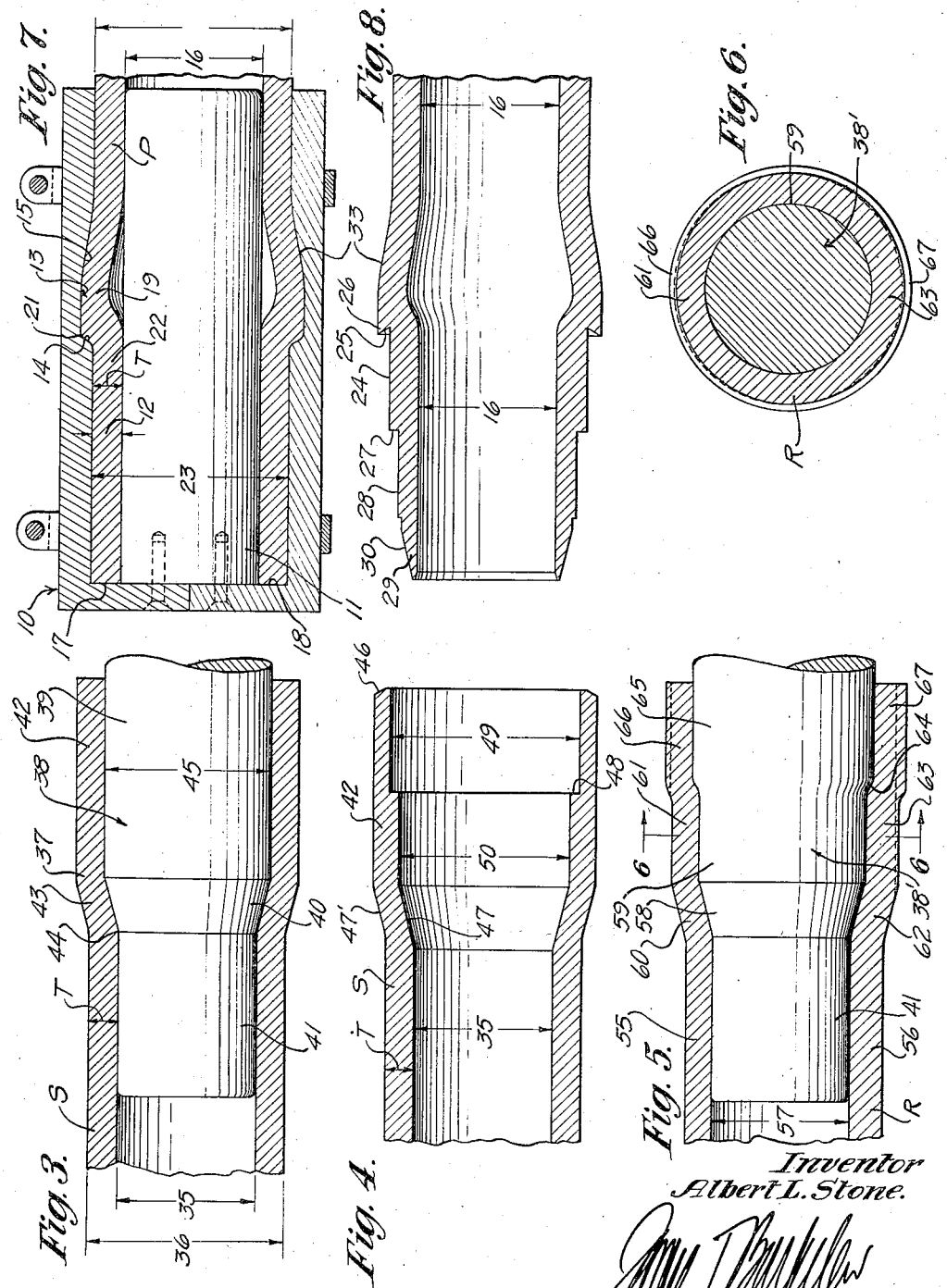
Inventor
Albert L. Stone.
Attorney.

Aug. 13, 1940.  A. L. STONE  2,211,178
METHOD OF MAKING A JOINT BOX ON END OF PIPE
Filed Aug. 21, 1937  3 Sheets-Sheet 3

Inventor
Albert L. Stone.

Attorney.

Patented Aug. 13, 1940

2,211,178

UNITED STATES PATENT OFFICE 2,211,178

METHOD OF MAKING A JOINT BOX ON END OF PIPE

Albert L. Stone, Redondo Beach, Calif., assignor to Hydril Company, Los Angeles, Calif., a corporation of California Application August 21, 1937, Serial No. 160,308

1 Claim. (Cl. 29—157)

This invention has to do generally with pipe joints and methods of making same, and is more particularly concerned with joints such as may be used with particular advantage in connection with well pipe.

The general object of the invention is to provide a relatively inexpensive, rapid and efficient method of manufacturing pipe joints and the production of particularly efficient joints thereby which are of a nature to assure fluid tight connection and ability effectively to withstand the torsional and tensil strains to which they are exposed. The joint preferably, though not necessarily, is of a type adapted for so-called "quick making and breaking."

While the invention, considered in its broader aspects, may be applied with advantage to pipe joints to be used for any purpose, it is particularly well adapted for use in casing employed in lining well bores. Likewise, the invention has advantage irrespective of the particular type of thread connection between the joint parts, but it is particularly advantageous in connection with threads of the step type. I will therefore describe the invention as applied to casing having two-step threads and particular seating engagement between complementary shoulders, but it is to be understood this choice of structural particularities is made merely for the purpose of clearly describing the nature of the invention by way of specific example and is in no way to be considered limitative on the invention except where in the claims the novel elements are associated in combination with those particularities.

In Patent No. 2,006,520 issued July 2, 1935, to Frederick Stone and myself on "Casing joint," there is illustrated and described a casing joint of the "flush" type, wherein there is a rather full discussion of the problems incident to casing joints and the solutions of those problems by the use of stepped threads and sequentially seating shoulders of the joint parts there disclosed. It is there emphasized that the walls of casing are relatively thin and, due to the necessity of preserving original inside and outside diameters, it was considered objectionable to upset the pipe at the joints, and therefore only little stock was available for the fashioning of sealing shoulders and of threads of the tapering or step type so desirable for securing quick make-and-break characteristics. In the patented structure, the original inside and outside diameters were preserved, so all the shouldering and step formation had to be accomplished by cutting away metal, thus materially reducing the thickness of the joint parts.

The mentioned patent gave a solution to the problem which is still feasible and in use, but it has been found that under certain circumstances it is highly desirable to increase the thickness of the metal at the joint parts beyond the degree illustrated in said patent. In accomplishing this it was found that, while the inside diameter had to be maintained of normal size to allow the passage of tools through the bore, it was feasible to increase the outside diameter of the casing at the joints, so long as that increase was not excessive and the shoulders at the swell, caused by the increase, were not too abrupt, for packing heads and the like through which the pipe may pass at times, have sufficient yieldability to allow passage of the slightly enlarged joints.

The increase in thickness was accomplished by upsetting the ends of the pipe, that is, heating said ends and then exposing them to endwise pressure which thickened or gathered the metal at the heated portion. However, this led to certain difficulties. In the first place, the upsetting decreased the inside diameter as well as increased the outside diameter, in fact, the natural tendency of the metal during upsetting operations is to gather or flow radially inwardly rather than outwardly. Further, most casing as it comes from the mill is of variable thickness (due to the usual condition of eccentricity between inside and outside peripheral faces) and when such pipe is upset, metal at the thicker portions tends to gather or flow longitudinally of the pipe to a much greater extent than it does at the thinner portions, and the upset was thus carried back unevenly. To play safe, the upset had to be carried back excessively far at the thicker portion to insure sufficient thickness of the thinner portion and, as a matter of precaution, the upsetting was extended longitudinally of the pipe far beyond the extent necessary to overlie the cuts later made to provide the mating shoulders and threads. With all this extra metal built up on the inside of the pipe, expensive and time consuming boring operations had to be performed to restore the inside diameter to normal dimension. Similarly, it was normally necessary to machine off the excessive metal on the outside of the pipe, particularly where pipe eccentricity caused aggravation of this condition.

Further, to make such long upsets, there was a normal tendency to kink or "fold" the pipe, with obvious attendant disadvantage.

Additionally, in order to carry on these upsetting operations, it was necessary to raise the temperature of the pipe end excessively or to expose it to several "heats," it resulting that after the operations were performed, the pipe had to be given additional, controlled heat treatment to restore it to its "normalized" or original heat-treated condition as it came from the mill.

All the above disadvantages are avoided by following my method, and a correspondingly improved joint results therefrom. Generally, I accomplish the result of increasing the joint strength with a minimum displacement of metal, but how this is done may be better understood from a reading of the step-by-step description of the following detailed discussion, reference being had to the accompanying drawings, in which:

Fig. 1 is a medial sectional view taken through a joint embodying my invention;

Fig. 2 is a view similar to Fig. 1 but showing a variational form of the invention;

Figs. 3 and 4 illustrate sequential steps performed in forming the box end of my improved joint and in accordance with my improved method;

Fig. 5 illustrates a further step which may be carried out in forming the box end, when certain conditions prevail;

Fig. 6 is a section on line 6—6 of Fig. 5;

Figs. 7 and 8 are schematic views showing one method of forming the improved pin end of my improved joint;

Figure 9:
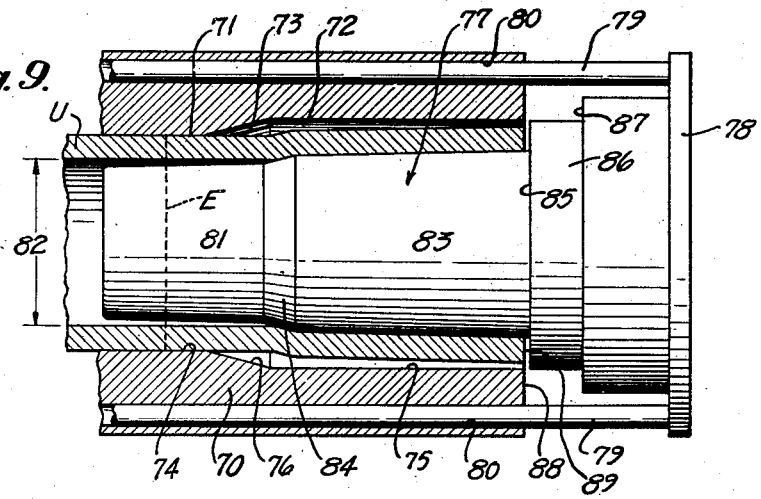
Figs. 9 and 10 are schematic representations of certain steps carried out in the formation of the box end on relatively thin-walled casing.

In well pipe casing the controlling or "designation" diameter is always the outside diameter, the outer peripheral face always coming from the mill in close proximity to a true round. However, while the size of a given well hole may call for casing of a definite given diameter, the nature of the hole may call for either relatively heavy or relatively light pipe. Therefore, casing of given diameter is supplied in different weights, the weight differential being secured by varying the inside diameter. Thus, in the drawings I have chosen to illustrate the invention applied to 8⅝" casing (the drawings being of approximately half size) though it will be understood this showing is not at all limitative on the invention. Figs. 1 and 2 are drawn in proportion throughout, but in all the remaining views, while the half-scale is maintained in representing wall thicknesses of 8⅝" casing, the bores have been reduced to an exaggerated extent in order to conserve space. Figs. 1, 2 and 9 to 11, inclusive, represent 36 lb. casing wherein the normal wall thickness is .400", while Figs. 3 to 8, inclusive, represent 43 lb. casing wherein the normal wall thickness is .487". As will appear, walls of different thicknesses may call for somewhat different treatment.

Though this is not restrictive, in carrying out my invention identical diameters and thread characteristics may be provided on the threaded portions of the joints irrespective of the pipe-weight, provided the pipe is of the same given outside diameter. For instance, the outside diameter of the threaded portion of the pin may be the same on an 8⅝"—36 lb. casing as on an 8⅝"—43 lb. casing, but the relatively reduced pin bore of the 43 lb. casing increases the thickness of the threaded portion over that of the 36 lb. casing. Similarly, in making up the box portion of the joints, internally-acting spreading or swaging members of the same effective diameter may be employed in all weights of pipe of given outside diameter, though, in the heavier pipe the expanded box has thicker walls than the box of lighter casing, this differential continuing to exist even after the internal box threads are cut.

This differential automatically compensates for the added strain put upon joints of heavier pipe. For instance, a 10,000' string of 43 lb. well casing weighs 70,000 lbs. more than an equal-length string of 36 lb. casing, but since the joint parts of the 43 lb. casing are thicker, the needed extra strength to support the increased load at each joint is inherently provided.

It will also appear from the following description that the overhanging lip on the pin end of the thread is provided by the formation of an external circumferential enlargement, thus leaving the full thickness of the pipe wall available for cutting the threads or any shoulders which may be necessary. Similarly, the shoulder on the end of the box which is to mate with the lip, is provided by the formation of a circumferential enlargement, with a consequent availability of at least full pipe thickness for cutting the threads and shoulders which are to be complementary to corresponding parts of the pin end. The advantages of these provisions are obvious.

As has been said, the outside of casing is normally round and true as it comes from the mill, making it possible to chuck the pin end in a turning or thread cutting machine with the outer periphery of the pin coaxial with the axis of rotation or work axis of that machine. On the other hand, in seamless tubing of which casing is often made, the bore axis is frequently offset with respect to the axis of the outer peripheral face, the resulting eccentricity between inner and outer peripheral faces thus making the pipe walls of variable thickness. It is desirable that the thread axis be coincident with the bore axis and accordingly the circumferential expansion of the box and the cutting of the threads are accomplished in a manner to maintain such coincidence, but this means that in such an "eccentric" box, the wall is of variable thickness. Were such a box then to be threadably connected to a pin (which, as has been explained, is concentric with the outer peripheral face of its pipe portion) the outer peripheral faces of box and pin where they meet would not match with a fully flush joint, but rather there would be projecting shoulders at opposite sides of the parting line, an obviously undesirable effect where such offsetting is of any appreciable degree. I have provided means for correcting this condition as will appear at a later point in the description.

Just as I have chosen to mention certain illustrative weights and dimensions of casing, I will also mention and have shown particularities such as angles of cut, types of threads, sequence of shoulder engagements, etc., but it will be understood this is done merely to give a clear description by way of example and is not intended as at all limitative on the broader aspects of the invention, except insofar as those particularities are brought into the claims. The same reservation applies to the sequence of steps in the described method, that is, certain of the steps may be altered in order of sequence or they may be combined in single operations without departing from the spirit and scope of the invention.

I will first describe the method of forming the pin end illustrated in Figs. 7 and 8. Both in these figures and in Fig. 3 the casing is represented as being relatively heavy (43 lb.) and as having concentric outer and inner peripheral faces. At 10 is represented a split die in the bore of which is detachably held a concentrically arranged mandrel 11, the annular space thus formed at 12 being, throughout the major portion of its extent, equal in width to the normal or original thickness of pipe P and being adapted to take the end of that pipe. However, intermediate the ends of the die, is cut a recess 13 having a relatively abrupt shoulder 14 and a relatively long inclined portion 15. The normal inside diameter of the pipe is indicated at 16.

Pipe P, before it is inserted in the die, is subjected to localized heat throughout and a little beyond each side of the zone which is later to lie opposite recess 13. The pipe is heated sufficiently to allow the following operation to be accomplished with ease, but its temperature need not be raised to a degree which tends to "de-normalize" the metal. The pipe is then inserted in the die until its end 17 abuts the end wall 18 of the die, and endwise pressure is then exerted on the pipe which causes it to bulge or expand circumferentially into recess 13, mandrel 11 serving as a means for "starting" the pipe to bulge outwardly by preventing inward radial movement thereof.

There is thus formed on pipe P at a point spaced from end 17, a circumferential enlargement 19 whose outer face corresponds to die-recess 13, while the inner face leads with gradual curves into the normal size bore which has been preserved at either side thereof by mandrel 11. The bulged portion will be at least of a thickness equal to the normal thickness T of the pipe, while at the high point 21 of the enlargement the thickness will be greater than normal, which is of advantage since it is opposite this point that the bore of the pipe starts to flare relatively abruptly, and it is at this point that certain cutting operations are later to be performed.

Now it lies within the scope of my invention to form this external circumferential enlargement in any suitable way, the illustrated schematic representation being for the purposes of clear example only. For instance, the circumferential expansion may be accomplished by any such well known means as roller-swages working from the inside of the pipe, or by spinning operations.

The pin portion of the joint is indicated at 22 and after the joint has been removed from the die (Fig. 8) this portion is machined to give it the proper characteristics for the later cutting or milling of the particular thread which may have been chosen. In the illustrated example this thread is of the two-step type which has been described in full detail in the aforementioned patent. Since the pin portion immediately at the left of enlargement 19 is of normal outside diameter 23 and this corresponds to the outside diameter of the large step of the thread to be cut thereon, step blank 24 does not have to be machined except to take a finishing cut while undercutting the high point 21 of the enlargement, this undercut providing a tapering annular seating face 25 on what may now be termed lip 26. The square-cut shoulder 27 extends from large step-blank 24 to small step-blank 28, and it is at predetermined distance from shoulder 25.

At predetermined distance from shoulders 25 and 27 is cut the tapering nose 29 having conical seating face 30. Threads such as 31 and 32 (Fig. 1) are then cut on step-blanks 24 and 25, respectively. While it has been explained that Figs. 7 and 8 represent a heavier casing than does Fig. 1, it has also been explained that threads of the same diameter are cut on these two weights of casing, so it will be seen that this cross-reference is proper.

The outer face 33 of enlargement 19 does not have to be machined, as the expanding operation leaves a slow, easy curve or taper which will not interfere with the passage of the enlargement through packing heads or the like. It will be seen that the bore of the finished pin has no zone of diminished diameter, that there are no abrupt shoulders presented within the bore, that the wall thickness is not diminished below normal at any point lying at the right of shoulder 27, and that the stock left after cutting seats 30 and threads 32 is of ample thickness to withstand whatever strains are normally imposed thereon.

Now referring to Figs. 3 and 4, it will be understood the normal bore 35 and outside diameter 36 of pipe S are of the same dimensions as corresponding parts of pipe P. In this case, the external circumferential enlargement 37 is formed by internal swaging, the pipe being heated, if necessary, to render it properly workable. Swage 38 includes a mandrel portion 39, spreading cone 40 and pilot 41. The pilot is of a diameter to fit, with working clearance, normal bore 35, while cone 40 and mandrel 39 are of a diameter to expand box 42 sufficiently to bring its outside diameter flush with the top of pin-lip 26. The angle of cone 40 preferably approximates that of pin nose 29.

When the swage is forced home as in Fig. 3, it will be seen that box 42 is expanded as shown and that the offsetting portion 43 (connecting the body portion and box portion of the pipe in offset relation) together with the wall of the box portion are of substantially the same thickness as normal wall T. Pilot 41 prevents any "dipping" or inward buckling of the pipe at the base 44 of offsetting portion 43. The expanded box bore 45 may be considered as a counterbore of the pipe, and it is concentric with normal bore 35.

After the swaging operation, the counterbore is machined as in Fig. 4, the end shoulder 46, internal conical seating shoulder 47 and square-cut shoulder 48 being cut complemental to shoulders 25, 30 and 27, respectively. The operations are so carried out that the axes of all these cut surfaces are coincident with the axis of the pipe, it being remembered that in this case it is assumed that the pipe is of equal thickness throughout. The spacing of the shoulders will be discussed later. Bores 49 and 50 are cut to diameters proper for the subsequent formation of threads 51 and 52, respectively (Fig. 1) which formation (made by cutting or milling operations) is accomplished after the box is in the condition of Fig. 4. The work is so chucked during cutting and threading operations that the finished threads are coaxial with the normal bore.

With the box thus completed, it will be seen that the walls of bores 50 and 47 are of substantially the same thickness as normal wall T, while the wall of bore 49 is of very little less thickness. It is found, however, that if the wall of conical bore 47 be no more than 85% of the thickness T, the joint will have ample strength.

The outer peripheral face of box 42 normally need not be machined, as the box will be flush with the peripheral face of pin-enlargement 19 when the pin and box are screwed together (Fig. 1) and the taper 47' is sufficiently long to allow easy passage through a packing head or the like. It will also be noticed that the inside diameter of pipe S has in no way been diminished.

In the aforementioned patent, the desirable qualities of the quick-make-and-break thread illustrated have been fully explained, as have also the features of the sequential seating of shoulders. It will suffice here to state that preferably the design is such that in making up the joints, nose 29 first seats on conical shoulder 47 and then shoulders 46 and 25 come to seat. Shoulders 27 and 48 normally remain spaced apart slightly, but if the joint is exposed to excessive torque strains, these shoulders meet to act as stops to prevent spreading of lip 26 or of the free end of the box. The displacement of metal necessarily occurring as the joint is tightened after the first shoulders have engaged, is fully set up in the patent and therefore need not be discussed here.

It has been previously pointed out that seamless tubing frequently comes from the mill in such shape that the axis of the bore does not coincide with the axis of the outer peripheral face, it following that the pipe is thicker on one side than on the other. Since, in the method discussed, the pilot of the swage is entered in the normal bore of the pipe, all swaged surfaces will be concentric with that bore, and if eccentricity between the bore-defining surface and the outer peripheral surface exists, the swaging operation carries the eccentricity into the box and when the joint is made up the box wall will overhang lip 26 on one side and lie beneath the outer periphery of the lip at the other side. Where the eccentricity is of a slight degree so that very small shoulders are formed by reason of this relative off-setting, no harm is done, but where it is of a relatively large magnitude the condition is objectionable.

In Fig. 5 such a situation is illustrated. Here, pipe R is relatively thin at side 55 and relatively thick at side 56. Since pilot 41 is entered in normal bore 57 with fairly close fit, the spreading cone 58 and mandrel portion 59 do nothing to change the eccentric relationship and walls 60 and 61 remain thinner than walls 62 and 63. This condition is not harmful at points spaced from the free end of the box, but must be corrected at the free end, for reasons given above. Therefore, I have provided swage 38' with an oversize swaging or spreading shoulder 64 and a correspondingly enlarged mandrel portion 65. When this swage is thrust home, the extremity of the box is further circumferentially expanded, but the thin side 66 is expanded to a position where it will be flush with or extend radially beyond the outer peripheral face of lip 26. Of course, the thicker portion 67 of the box end will be moved radially outwardly a corresponding distance and would, if not corrected, extend beyond lip 26 much further than it did originally. However, with the pipe in the condition of Fig. 5, the outer peripheral face of the enlarged box portion is turned down to the extent indicated by dotted lines in Fig. 5, the cut being such that the peripheral surface thus formed is coaxial with the pipe bore and of a diameter to make a flush joint with the pin lip 26.

This further spreading of the outermost end of the box is helpful also in that it reduces the amount of cutting necessary to machine bore 49 to the required diameter. However, it will be noted that the spreading of this outermost end is such that its inside diameter is less than the normal outside diameter of the pipe, proper, by an amount equal at least to twice the depth of the thread to be cut (Fig. 1) so that after that thread is cut it will take the thread on the mating pin portion without requiring that the pin portion be expanded diametrically to bring about full-depth thread engagement, it being remembered that the outside diameters of pin and box pipes are the same. This being true, it will be seen that the same relative condition must prevail between the outside diameter of the pipe and the inside diameter of the smaller step of the counterbore. It likewise prevails between the outside diameter of pipe S and box bore 45 in Fig. 3.

With the box in the condition of Fig. 5 (plus the cutting away of metal to the dotted lines) the same machining and threading operations are performed as described in connection with Fig. 4 and Fig. 1.

Figure 10:
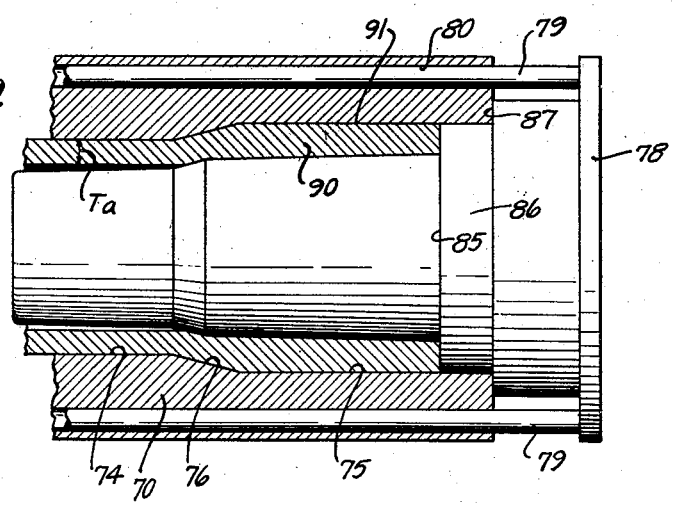

In Figs. 9 and 10 I have shown a method of preparing the box end of the joint where the pipe (though of the same outside diameter as is pipe S) is of lighter weight (36 lb.) so it is desirable to upset the pipe, as well as swage it, in order o provide ample thickness for the box wall after having increased the outside diameter of the box to an extent which will match the outside diameter of the lip on the pin.

In this case I use a combination die, swage and upsetter. Die 70 has a bore 71 of a diameter to take pipe U (⅝" outside diameter), a counterbore 72 which is of a diameter equal to the outside diameter of lip 26, and a conical bore 73 which is of approximately the same angle as nose 29. The defining walls of these bores are indicated at 74, 75 and 76, respectively.

Adapted to reciprocate through the bore of the die is a combination swage and upsetter 77, the head 78 thereof carrying guide rods 79 entered in die-ways 80 to maintain the swage-upsetter in coaxial relationship with the die bore throughout such reciprocation.

Member 77 has a pilot portion 81 which preferably tapers slightly and is a little smaller at its right hand end than is the normal pipe bore 82, so it may be entered in what I have termed "eccentric" pipe without thrusting the mandrel out of its coaxial relation to the die bore. Mandrel portion 83 also preferably tapers slightly, while the spreader cone 84 is of a diameter and angle approximating that of nose 29. An annular pressure shoulder 85 is formed between mandrel portions 83 and 86, the latter being cylindrical and of a diameter to fit nicely in die-bore 72. An annular shoulder 87 is preferably provided as a means for engaging die-end 88 to act as a limit stop for the relative telescopic movement of the die and member 77.

Pipe U is first heated from its end 89 to a point just a short distance to the left of where the box expansion is to lie (for instance to a point about at E) and is then thrust into the die until its end 89 is about flush with die-end 88. The pipe is then backed up at its left hand end or is otherwise suitably held from bodily longitudinal movement, and member 77 is entered in the manner indicated in Fig. 9.

Up to the time shoulder 85 contacts end 89, member 77 acts merely to swage or expand the box. However after shoulder 85 contacts that end, an upsetting action results, that is, the metal is gathered longitudinally and hence spread radially by reason of the endwise pressure exerted thereagainst, though simultaneously and up to the time shoulder 87 contacts end 88, cone 84 continues to act as a spreader.

During the upsetting operation, the pilot and mandrel portion 83 prevent displacement of the pipe metal radially inward, while pilot 81 and bore wall 71 (together with the fact that the pipe is heated only to about point E) prevent any appreciable thickening of the pipe at a point to the left of the box portion. Consequently the metal, under the upsetting pressure has no place to go except radially outward and the parts of the die and the member 77 as so designed that, by the time member 77 is fully entered (Fig. 10) the space between mandrel portion 83 and die wall 75 will be completely filled with metal, and the metal will likewise extend up into contact with conical die bore 76. The box wall 90 will thus have been considerably thickened beyond normal thickness Ta and the other peripheral face 91 of the box will be of a diameter to match the outside diameter of lip 26. Thereafter, the box end is treated exactly as was described in connection with the box end of Fig. 4, both as to cutting of shoulders and bores and as to threading. As in the previous cases, the box-expansion is such that the inside diameter of the counterbore is less than the outside diameter of the pipe, proper, by an amount not less than twice the depth of the thread to be cut.

Should the pipe U be "eccentric," the condition is automatically remedied during the upsetting operation. For when the endwise, upsetting pressure is applied, the metal from the relatively thick side of the box will, after its outer periphery has contacted die face 75, be forced circumferentially around the box and thus build up the thinner side until its outer periphery also contacts die wall 75. The excess metal on the thick side of the box has no place to go except in the direction indicated, for it has been pointed out that the opposed faces of the mandrel and die prevent radial inward gathering of the metal and also prevent longitudinal flow into the main body of the pipe.

Fig. 1 shows the appearance of pipe U after its box end has been completely formed, and it will be seen that ample wall thicknesses are maintained without forming excessive external circumferential enlargements or any diminishment of the bore.

Figure 11:
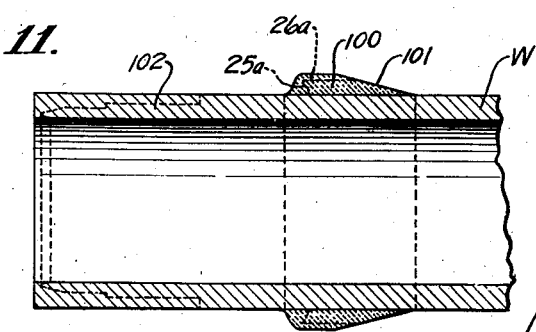
Fig. 11 is a sectional view illustrating certain steps in forming a variational type of pin end.

In Fig. 11 I have shown a variant method of providing a circumferential enlargement on the pin end of pipe W. In this case, the pipe is not deformed in any manner, that is, its normal inside and outside diameters are maintained, while the circumferential enlargement 100 is formed by building up a ring of welding metal. This ring is later machined down as indicated in dotted line to give it the same outside diameter as lip 26 (see lip 26a) and is undercut as at 25a to form a shoulder similar to 25 in Fig. 8. The angle 101 of the enlargement preferably is about the same as that of surface 33 in Fig. 8 so its passage through packing heads or the like may be relatively free.

The pin end 102 is subsequently machined as indicated in dotted lines to give it the general characteristics shown in Fig. 8, with a usual two-stepped thread formed thereon. Or, if desired, a tapered V thread 103 may be substituted for the step-thread, in which case the box member 104, otherwise similar to box member 42, has complementary tapered, V thread 105.

Of course, the joint may be made up in various combinations, for instance, the weld type of circumferential enlargement may be substituted for the deformed enlargement of Fig. 1 or the V thread of Fig. 2 may be substituted for the step-threads of Fig. 1. It will also be understood that I may utilize the double swaging operation illustrated in Fig. 5 in connection with a box which has been upset as well as swaged (Fig. 10) in the event the upsetting does not entirely compensate for the original eccentricity of the pipe, or, in the heavier pipe, I may upset as well as swage. Various other modifications and changes in design, form and procedure may be made without departing from the spirit and scope of the appended claim.

I claim:

The method of forming a swaged, two-step internally threaded joint-box on the end of a pipe having a normal bore of given diameter and a given normal outside diameter, that includes diametrically expanding the open end of the pipe to form a counterbore, and further diametrically expanding the outer extent of the counterbore to an inside diameter less than the normal outside diameter of the pipe by an amount equal at least to twice the depth of the thread to be cut, and cutting internal threads in both the inner and outer extents of the counterbore, the diametral distance across the threaded portion of said outer extent, as measured from thread-root to thread-root, being no greater than the normal outside diameter of the pipe.

ALBERT L. STONE.